(12) United States Patent
Golovashkin et al.

(10) Patent No.: US 11,775,833 B2
(45) Date of Patent: *Oct. 3, 2023

(54) ACCELERATED TR-L-BFGS ALGORITHM FOR NEURAL NETWORK

(71) Applicant: Oracle International Corporation, Redwood Shores, CA (US)

(72) Inventors: Dmitry Golovashkin, Belmont, CA (US); Uladzislau Sharanhovich, San Jose, CA (US); Vaishnavi Sashikanth, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 16/592,585

(22) Filed: Oct. 3, 2019

(65) Prior Publication Data

US 2020/0034713 A1    Jan. 30, 2020

Related U.S. Application Data

(63) Continuation of application No. 14/823,167, filed on Aug. 11, 2015, now Pat. No. 10,467,528.

(51) Int. Cl.
*G06N 3/082*    (2023.01)

(52) U.S. Cl.
CPC ............................ *G06N 3/082* (2013.01)

(58) Field of Classification Search
CPC .................................................... G06N 3/082
See application file for complete search history.

(56) References Cited

U.S. PATENT DOCUMENTS

| 5,649,066 A | 7/1997 | Lacher |
| 5,950,191 A | 9/1999 | Schwartz |
| 6,826,668 B1 * | 11/2004 | Hsu ..................... G11B 20/10 |
| | | 711/167 |
| 7,028,023 B2 | 4/2006 | Wang |

(Continued)

OTHER PUBLICATIONS

The Structure and Function of Complex Networks M. E. J. Newman (Year: 2003).*

(Continued)

*Primary Examiner* — Brian M Smith
*Assistant Examiner* — Ababacar Seck
(74) *Attorney, Agent, or Firm* — Hickman Becker Bingham Ledesma LLP; Brian N. Miller

(57) ABSTRACT

Techniques herein train a multilayer perceptron, sparsify edges of a graph such as the perceptron, and store edges and vertices of the graph. Each edge has weight. A computer sparsifies perceptron edges. The computer performs a forward-backward pass on the perceptron to calculate a sparse Hessian matrix. Based on that Hessian, the computer performs quasi-Newton perceptron optimization. The computer repeats this until convergence. The computer stores edges in an array and vertices in another array. Each edge has weight and input and output indices. Each vertex has input and output indices. The computer inserts each edge into an input linked list based on its weight. Each link of the input linked list has the next input index of an edge. The computer inserts each edge into an output linked list based on its weight. Each link of the output linked list comprises the next output index of an edge.

20 Claims, 16 Drawing Sheets

(56) References Cited

U.S. PATENT DOCUMENTS

| | | | | |
|---|---|---|---|---|
| 7,143,091 | B2* | 11/2006 | Charnock | G06Q 10/10 |
| | | | | 707/999.005 |
| 7,409,372 | B2* | 8/2008 | Staelin | G06N 3/08 |
| | | | | 706/15 |
| 8,332,333 | B2* | 12/2012 | Agarwal | G06F 16/951 |
| | | | | 706/12 |
| 9,330,063 | B2* | 5/2016 | Panigrahy | G06F 17/10 |
| 9,730,643 | B2* | 8/2017 | Georgescu | G06V 10/82 |
| 9,767,410 | B1 | 9/2017 | Guevara et al. | |
| 10,521,473 | B2* | 12/2019 | Jin | G06Q 50/01 |
| 2004/0059695 | A1* | 3/2004 | Xiao | G06N 3/082 |
| | | | | 706/26 |
| 2005/0038533 | A1 | 2/2005 | Farrell | |
| 2006/0036559 | A1* | 2/2006 | Nugent | G06N 3/08 |
| | | | | 706/23 |
| 2006/0112028 | A1* | 5/2006 | Xiao | G06N 3/08 |
| | | | | 706/15 |
| 2006/0206872 | A1 | 9/2006 | Krishaswamy | |
| 2009/0271433 | A1* | 10/2009 | Perronnin | G06F 18/2323 |
| 2010/0060643 | A1* | 3/2010 | Kolipaka | G06T 11/206 |
| | | | | 345/440 |
| 2012/0158628 | A1* | 6/2012 | Junker | G06N 5/00 |
| | | | | 706/14 |
| 2012/0203583 | A1* | 8/2012 | Junker | G06N 20/10 |
| | | | | 705/7.11 |
| 2012/0317142 | A1 | 12/2012 | Broecheler | |
| 2013/0159231 | A1* | 6/2013 | Modha | G06N 3/04 |
| | | | | 706/27 |
| 2014/0143280 | A1* | 5/2014 | Duan | G06F 16/211 |
| | | | | 707/798 |
| 2014/0143329 | A1 | 5/2014 | Garg | |
| 2014/0279306 | A1* | 9/2014 | Shi | G06Q 40/12 |
| | | | | 705/30 |
| 2015/0066485 | A1* | 3/2015 | Barrett | G06F 16/374 |
| | | | | 704/10 |
| 2015/0178410 | A1* | 6/2015 | Carter | G06Q 10/047 |
| | | | | 703/1 |
| 2015/0242532 | A1* | 8/2015 | Davies | G06F 16/00 |
| | | | | 707/798 |
| 2015/0373049 | A1* | 12/2015 | Sharma | H04L 63/126 |
| | | | | 726/22 |
| 2016/0155049 | A1* | 6/2016 | Choi | G06N 3/084 |
| | | | | 706/16 |
| 2016/0328643 | A1* | 11/2016 | Liu | G06N 3/0454 |
| 2017/0046614 | A1 | 2/2017 | Golovashkin | |
| 2018/0048620 | A1* | 2/2018 | Inoue | H04L 67/2819 |
| 2018/0144352 | A1* | 5/2018 | Ram | G06Q 50/20 |

OTHER PUBLICATIONS

Local Graph Sparsification for Scalable Clustering Satuluri, et al. (Year: 2011).*
Graph clustering Satu Elisa Schaeffer (Year: 2007).*
Spectral Sparsification of Graphs: Theory and Algorithms Batson et al. (Year: 2013).*
De-anonymizing Private Data by Matching Statistics Jayakrishnan Unnikrishnan and Farid Movahedi Naini (Year: 2013).*
Mean-field behavior of the negative-weight percolation model on random regular graphs Oliver Melchert and Alexander K. Hartmann (Year: 2011).*
A Sketching Algorithm for Spectral Graph Sparsification Chen et al. (Year: 2014).*
Semi-Supervised Learning Using Greedy Max-Cut Wang et al. (Year: 2013).*
Rule Generation from Neural Networks LiMin Fu (Year: 1994).*
Nonparametric Sparsification of Complex Multiscale Networks foti et al. (Year: 2011).*
Golovashkin, U.S. Appl No. 14/832,167, filed Aug. 11, 2015, Notice of Allowance, dated Jul. 3, 2019.
Golovashkin, U.S. Appl No. 14/823,167, filed Aug. 11, 2015, Office Action, dated Mar. 8, 2018.
Golovashkin, U.S. Appl No. 14/823,167, filed Aug. 11, 2015, Notice of Allowance, dated Mar. 5, 2019.
Golovashkin, U.S. Appl No. 14/823,167, filed Aug. 11, 2015, Interview Summary, dated Nov. 19, 2018.
Golovashkin, U.S. Appl No. 14/823,167, filed Aug. 11, 2015, Interview Summary, dated Jun. 7, 2018.
Golovashkin, U.S. Appl No. 14/823,167, filed Aug. 11, 2015, Final Office Action, dated Sep. 17, 2018.
Golovashkin, U.S. Appl No. 14/823,167, filed Aug. 11, 2015, Advisory Action, dated Nov. 29, 2018.
Terry et al., "Edge Detection Using Neural Networks", dated 1993 5 pages.
Sohl-Dickstein et al., Fast Large-Scale Optimization by Unifying Stochastic Gradient and Quasi-Newton Methods, dated 2014, 9 pages.
Seidl, Robert, "Preconditioning for Hessian Free Optimization" dated 2012.
Schmidt et al., "Learning Recurrent Neural Networks with Hessian-Free Optimization", dated 2011, 8 pages.
Schmidt et al., "Learning Graphical Model Structure Using L1-Regularization Paths", dated 2007, 175 pages.
Nicol N. Schraudolph, "Fast Curvature Matrix-Vector Products for Second-Order Gradient Descent", Neural Computation 14, 1723-1738, dated (2002), 16 pages.
Ganguli, Surya, "Fast Large Scale Optimization by Unifying Stochastic Gradient and Quasi-Newton Methods", dated 2014, 9 pages.
Copplola et al., "Ibfgs: Efficient L-BFGS and OWL-QN Optimization in R", 2014, 15 pgs.
Byrd et al., "A Stochastic Quasi-Newton Method for Large Scale Optimization", dated 2015, 31 pages.
Burke et al., "Limited Memory BFGS Updating in a Trust-Region Framework" This research was supported by National Science Foundation Grant, dated Apr. 1, 2008, 11 pages.
Bishop, Christopher, "Exact Calculation of the Hessian Matrix for the Multi-layer Perceptron", Published in Neural Computation 4 No. 4 dated (1992) 494-501.

* cited by examiner

FIG. 3

$E(w)$    the objective function value (error function), $g(w) \equiv \nabla E(w)$    the gradient of the objective function, $\tilde{H}(w)$    the (sparse) matrix of partial second derivatives:

$$\tilde{h}_{ij} = \begin{cases} \dfrac{\partial^2 E(w)}{\partial w_i \partial w_j} & \text{if } i \in S \wedge j \in S \\ 0 & \text{otherwise} \end{cases}$$

FIG. 4

$$H \leftarrow \tilde{H} - [\tilde{H}S \quad Y] \begin{bmatrix} S^T\tilde{H}S & L \\ L^T & -D \end{bmatrix}^{-1} \begin{bmatrix} S^T\tilde{H} \\ Y^T \end{bmatrix}$$

$$S = [s_1, \ldots, s_k]$$

$$Y = [y_1, \ldots, y_k]$$

$$D = \mathrm{diag}[s_0^T y_0, \ldots, s_{k-1}^T y_{k-1}]$$

$$(L_k)_{ij} = \begin{cases} s_{i-1}^T y_{i-1} & \text{if } i > j \\ 0 & \text{otherwise} \end{cases}$$

$$\underset{p}{\text{minimize}} \quad E + \frac{1}{2} g^T p + p^T H p$$
$$\text{subject to} \quad \|p\| \leq d$$

FIG. 5

ACCELERATED TR-L-BFGS ALGORITHM FOR NEURAL NETWORK

CROSS-REFERENCE TO RELATED APPLICATIONS; BENEFIT CLAIM

This application claims the benefit as a Continuation of application Ser. No. 14/823,167, filed Aug. 11, 2015, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application.

FIELD OF THE DISCLOSURE

This disclosure relates to directed acyclic graphs. Techniques of graph storage and edge sparsification are presented. These techniques are combined herein to accelerate training of an artificial neural network.

BACKGROUND

A feedforward artificial neural network is a category of machine learning models, which includes, as core concepts, directed acyclic graphs and connection weights. The neurons of a neural network may be partitioned into layers, such as input, hidden, and output layers. The neurons of an input layer do not have associated activation functions. An activation function associated with a neuron may be logistic sigmoid, hyperbolic tangent, linear, or identity.

A neural network must be trained before it can be used for prediction. Training entails determining the weights. Training usually involves solving an unconstrained optimization problem. After training, the network can be used for prediction by propagating the inputs and computing the values of the output neurons.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts example mathematical formulae, in an embodiment;

FIG. 4 depicts example mathematical formulae, in an embodiment;

FIG. 5 depicts an example mathematical formula, in an embodiment;

DETAILED DESCRIPTION

Figure 1:
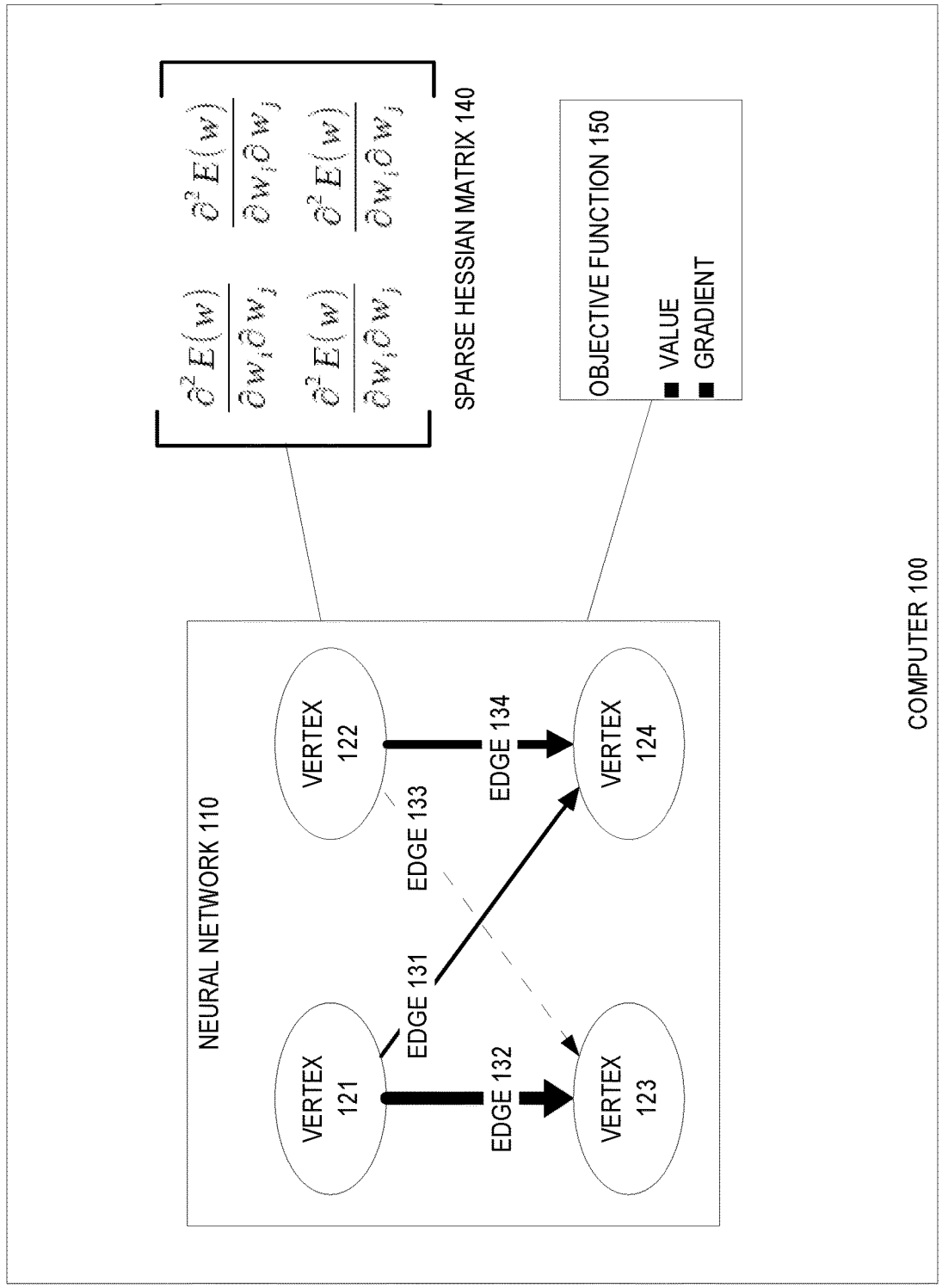
FIG. 1 is a block diagram that depicts an example system architecture, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Training System Overview
3.0. Example Training Process
4.0 Sparse Hessian Matrix
   4.1 TR-L-BFGS
5.0 Edge Table And Node Table
   5.1 Graph Storage Process
   5.2 Sparsification Based On Node Table, Edge Table, And Metadata
   5.3 Sparsification Based On Criteria
6.0 Phases Of A Sparsification Iteration
   6.1 First Phase Of A Sparsification Iteration
      6.1.1 First Step Of First Phase
      6.1.2 Second Step Of First Phase
      6.1.3 Third Step Of First Phase
      6.1.4 Fourth Step Of First Phase
         6.1.4.A Step 1102
         6.1.4.B Step 1104
         6.1.4.C Step 1106
         6.1.4.D Step 1108
   6.2 Second Phase Of A Sparsification Iteration
      6.2.1 First Step Of Second Phase
      6.2.2 Second Step Of Second Phase
         6.2.2.A Removal Step 1302
         6.2.2.B Removal Step 1304
      6.2.3 Third Step Of Second Phase
         6.2.3.A Restoration Step 1402
         6.2.3.B Restoration Step 1404
      6.2.4 Fourth Step Of Second Phase
      6.2.5 Fifth Step Of Second Phase
         6.2.5.A Output Step 1502
         6.2.5.B Output Step 1504
         6.2.5.C Output Step 1506
      6.2.6 Sparsification Results Transfer
7.0 Hardware Overview
8.0 Additional Example Embodiments

1.0 GENERAL OVERVIEW

Computerized techniques are provided for accelerated training of a multilayer feedforward artificial neural network, edge sparsification of a directed acyclic graph such as the neural network, and storage of the graph.

An embodiment includes an accelerated training method for a multilayer feedforward neural network of edges and vertices to be performed by a computer. Each edge has a weight. The computer sparsifies the edges of the neural network. The computer performs a forward-backward pass on the neural network to calculate an objective function value, a gradient of the objective function, and a sparse Hessian matrix. Based on the sparse Hessian matrix, the computer performs a quasi-Newton method optimization of the neural network. The computer iteratively repeats these steps until the computer detects convergence.

Another embodiment includes a time-space optimized method of storing a graph of edges and vertices, such as those of a neural network, to be performed by a computer. The computer stores an array of edges of the graph. Each edge originates at a vertex and terminates at a vertex. Bias edges originate at a bias node. Each edge has a weight, an input index, and an output index. The computer stores an array of vertices of the graph. For each edge of the graph, the computer inserts each edge into an input linked list of edges at a list position based on the weight of edge. Each link of the input linked list has the next input index of an edge of the graph. For each edge of the graph, the computer inserts each edge into an output linked list of edges at a list position based on the weight of each edge. Each link of the output linked list comprises the next output index of an edge of the graph.

2.0 TRAINING SYSTEM OVERVIEW

FIG. 1 is a block diagram that depicts an example computer 100, in an embodiment. Computer 100 performs nonlinear unconstrained optimization for accelerated training of an artificial neural network. Computer 100 may be a personal computer, a rack server such as a blade, a mainframe, a Beowulf cluster, or other aggregation of computers arranged for parallel distributed computing, such as a compute grid or a supercomputer. Computer 100 may have high performance processors, such as a vector processor, a graphics processor, or a multicore processor. Computer 100 includes neural network 110, objective function 150, and sparse Hessian matrix 140. These are stored within the, perhaps distributed, memory of computer 100.

Neural network 110 is an artificial neural network that includes many interconnected neurons, such as vertices 121-124. Vertices 121-124 are representative of many, perhaps hundreds of billions, of neurons in neural network 110. The neurons of neural network 110 are interconnected by many synapses, such as edges 131-134. Edges 131-134 are representative of many, perhaps hundreds of trillions, of synapses in neural network 110.

The edges of neural network 110 are directed. An edge originates at a vertex and terminates at another vertex. Together the edges and vertices of neural network 110 form a directed graph. Neural network 110 has additional topological constraints. Because neural network 110 is feedforward, the graph of neural network 110 is a directed acyclic graph.

Neural network 110 is a multilayer feedforward neural network, also known as a multilayer perceptron. Because neural network 110 is multilayer, the vertices of its graph are arranged in layers. For example, vertices 121-122 are in a layer, and vertices 123-124 are in another layer. Being a multilayer feedforward neural network, edges always interconnect between layers and never within a layer. All edges that originate in a first layer terminate in a second layer. Likewise, all edges that terminate in the second layer originate in the first layer. Although neural network 110 shows only two layers, these layers are representative of more layers in neural network 110. Typically neural network 110 has at least three layers, such as an input layer, a hidden layer, and an output layer. Neural network 110 may have tens of layers.

Each edge has a signed numeric weight. FIG. 1 depicts edge thickness according to edge weight. For example, edge 132 is shown thicker than edge 131 because edge 132 has more weight. During training a stimulus, such as a test pattern, is applied to a first layer of neural network 110, such that each vertex of the first layer receives a signed numeric value. The value of the vertex is emitted along each edge that originates at the vertex. Each edge scales this value according to the weight of the edge and then transmits the result to a vertex in the next layer. Many edges may terminate at a vertex. That vertex sums the values delivered by those edges, applies an activation function, and then transmits the result to edges that it originates.

Before training, the vertices of each layer are fully connected with the vertices of a next layer. A neural network model can have hundreds of billions of edges. The burden of operating, during training or production, so big a neural network is computationally excessive, consuming relatively vast amount computer resources and time to compute. Computation is reduced by simplifying the graph of neural network 110. Use of a simplified graph of neural network 110 requires less computer resources and time to compute the Hessian matrix.

The logical significance of an edge is proportional to the absolute value of its weight. An edge with nearly zero weight has miniscule significance or impact on the operation of neural network 110. However, the computational burden of all edges is identical, regardless of weight. Sparsification is the elimination of edges of nearly zero weight which, if done selectively, simplifies the Hessian matrix without compromising the mathematical functionality of neural network 110. A sparser Hessian matrix speeds training and production operation, and also reduces the memory footprint in production.

Computer 100 performs sparsification by selecting edges to remove. For example, edge 133 is shown as thin because its weight is nearly zero. Computer 100 may select edge 133 for removal, with edge 133 depicted as a dashed line to indicate removal. Computer 100 may select an edge for removal based on additional criteria besides weight. For example, computer 100 may be configured to remove an edge from a vertex whose count of input edges or output edges exceed a threshold. Likewise, computer 100 may avoid removing an edge from a vertex whose count of input edges or output edges falls below another threshold. As such, computer 100 may achieve input and output edge counts within a range. Likewise, computer 100 may achieve a combined weight of input or output edges within a range. Computer 100 may maintain a combined weight of input or output edges within a tolerance of a combined weight of the original graph before sparsification.

Sparsification simplifies the Hessian matrix, but does not accomplish training. Training entails adjustment of edge weights to alter the mathematical functionality of neural network 110, thereby improving the overall behavior of neural network 110. If neural network 110 is used for pattern recognition, such as optical character recognition, then the overall behavior of neural network 110 is improved when the accuracy of recognition improves. During training, the accuracy of neural network 110 is quantified according to objective function 150. Objective function 150 compares an actual behavior of neural network 110 with an expected behavior. For example, although neural network 110 may be trained with a letter "E" as a test pattern, neural network 110 may wrongly decide that the test pattern instead is a letter "F". Objective function 150 measures a value, which is the magnitude of such a mistake. For example, misjudging an "E" as a visually dissimilar "0" is a bigger error than misjudging an "E" as a visually similar "F".

As edge weights are intelligently adjusted, the value yielded by objective function 150 approaches some constant limit that represents perfect accuracy. However, this approaching occurs gradually, for which computer 100 may calculate a gradient of objective function 150. Gradual approaching occurs because training entails repetition by iteration. Each iteration has three phases. The first phase is sparsification.

The second phase is a forward-backward pass over the graph. During the forward-backward pass, computer 100 calculates a value of and a gradient of the objective function on the full graph, and calculates the Hessian matrix 140 on the sparsified or reduced graph. The elements of sparse Hessian matrix 140 are coefficients calculated as partial second derivatives of edge weights. Calculation of sparse Hessian matrix 140 during an iteration is based on sparse Hessian matrix 140 of the previous iteration. As sparsification removes edges from the graph, the graph becomes sparser. This makes the Hessian matrix 140 sparser, such that more coefficients of sparse Hessian matrix 140 become zero, with zero representing a removed edge. Computer 100 may store sparse Hessian matrix 140 in a format optimized for a sparse matrix.

The third phase of each iteration entails solving a quasi-Newton method of optimization based on sparse Hessian matrix 140 and the value of and the gradient of objective function 150. This solving calculates adjustments to edge weights, which improves the accuracy of neural network 110. Quasi-Newton methods boost efficiency by avoiding fully calculating a Hessian matrix every iteration. Instead, quasi-Newton methods incrementally update a reusable Hessian matrix based on calculated gradients.

The quasi-Newton method may be a Broyden-Fletcher-Goldfarb-Shanno (BFGS) algorithm. Because the graph may be huge, the quasi-Newton method may be tailored to save space, such as a limited memory BFGS (L-BFGS). Because training is so slow, the quasi-Newton method may be tailored for acceleration, such as with a trust region. For example, the quasi-Newton method may be a trust region L-BFGS (TR-L-BFGS) algorithm.

Solving the quasi-Newton method yields adjusted edge weights, which might or might not be optimal. If the gradient of objective function 150 is steep, then training is incomplete, and computer 100 iterates again in pursuit of optimality. If the gradient of objective function 150 is flat then a, hopefully global, optimum is reached, iteration ceases, and training is finished.

3.0 EXAMPLE TRAINING PROCESS

Figure 2:
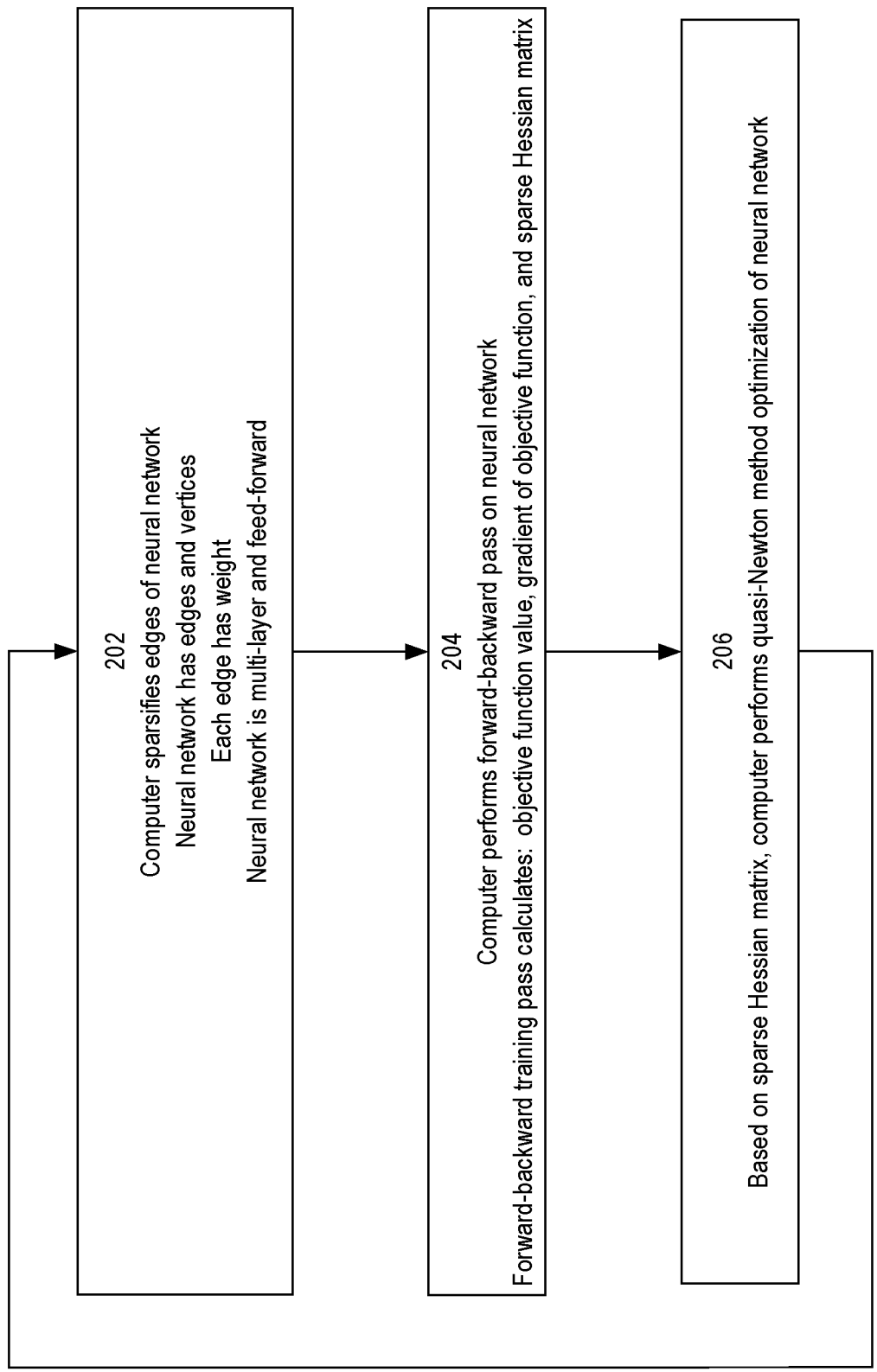
FIG. 2 is a flow diagram that depicts an example training process, in an embodiment.

FIG. 2 is a flow diagram that depicts a training process, in an embodiment. The training process is described in the context of FIG. 1.

Step 202 includes sparsification. For example, computer 100 sparsifies the edges of neural network 110. Neural network 110 has edges and vertices. Each edge has a weight. Neural network 110 is multilayer and feedforward. Computer 100 may select edges for removal based on edge weight and other heuristics. Computer 100 may select edges having a weight near zero. Computer 100 may refrain from removing an edge that would leave a vertex with too few input edges or output edges. Computer 100 may be configured to not excessively disturb an aggregate weight of input or output edges of a vertex. For example, removal of an edge with a negative weight may necessitate removal of an edge with a positive weight to retain an aggregate weight.

Step 204 includes a forward-backward pass. For example, computer 100 calculates a value of and a gradient of objective function 150. Computer 100 also calculates sparse Hessian matrix 140 of coefficients based on partial second derivatives of edge weights. Computer 100 does not calculate Hessian coefficients for edges that were removed. Hence, removal of edges reduces the computational burden of computer 100. Therefore, each iteration of the training process is progressively faster than the previous iteration.

Step 206 includes quasi-Newton method optimization. For example, computer 100 may perform a TR-L-BFGS algorithm based on sparse Hessian matrix 140 and the value of and the gradient of objective function 150. Solving the quasi-Newton method yields adjusted edge weights.

After performing these steps of the training process, computer 100 decides whether convergence is achieved. A threshold exceeding a norm of the gradient of the objective function indicates convergence. If computer 100 does not detect convergence, the training process repeats another iteration. Convergence may require hundreds of iterations. Indeed, quasi-Newton methods are not guaranteed to converge. Although not shown, the training process ceases when computer 100 detects convergence.

4.0 SPARSE HESSIAN MATRIX

FIG. 3 depicts formulae involved with computing a coefficient within a sparse Hessian matrix. Function E(w) denotes a computed value of an objective function, also known as an error function. The objective function calculates a difference between an actual weight of an edge and an expected weight needed to achieve accurate pattern recognition.

Function g(w) calculates a gradient of the objective function by comparing the weight of an edge with its weight in the prior iteration. The gradient indicates the rate of convergence. An edge with a high gradient may need continued adjustment. An edge with a low gradient may have achieved an optimum and might not need adjustment in subsequent iterations.

Function Ĥ(w) calculates a sparse Hessian matrix of coefficients. Element ĥij comprises an individual coefficient. Each coefficient comprises a partial second derivative of an edge weight. Zero may indicate a removed edge.

FIG. 4 depicts formulae involved with computing a sparse Hessian matrix of a current iteration based on a sparse Hessian matrix of an immediately prior iteration. Variable $y_i$ comprises an output value of an individual vertex. Variable si comprises an output value of an individual edge. Variable k is the current iteration.

4.1 TR-L-BFGS

FIG. 5 depicts a formula for optimization by solving according to TR-L-BFGS. The formula calculates edge weight adjustments. Variable d is the current trust region radius. TR-L-BFGS is designed for optimizing a smooth function that lacks constraints. Those are characteristics of axon weight optimization. Because of its linear space requirement, TR-L-BFGS is well suited for a huge neural network. A simplified model of an objective function accelerates calculation for a small portion the objective function, which is the trust region. The size of the trust region is dynamically adjustable based on the ratio of expected optimization to achieved optimization.

5.0 EDGE TABLE AND NODE TABLE

Figure 6:
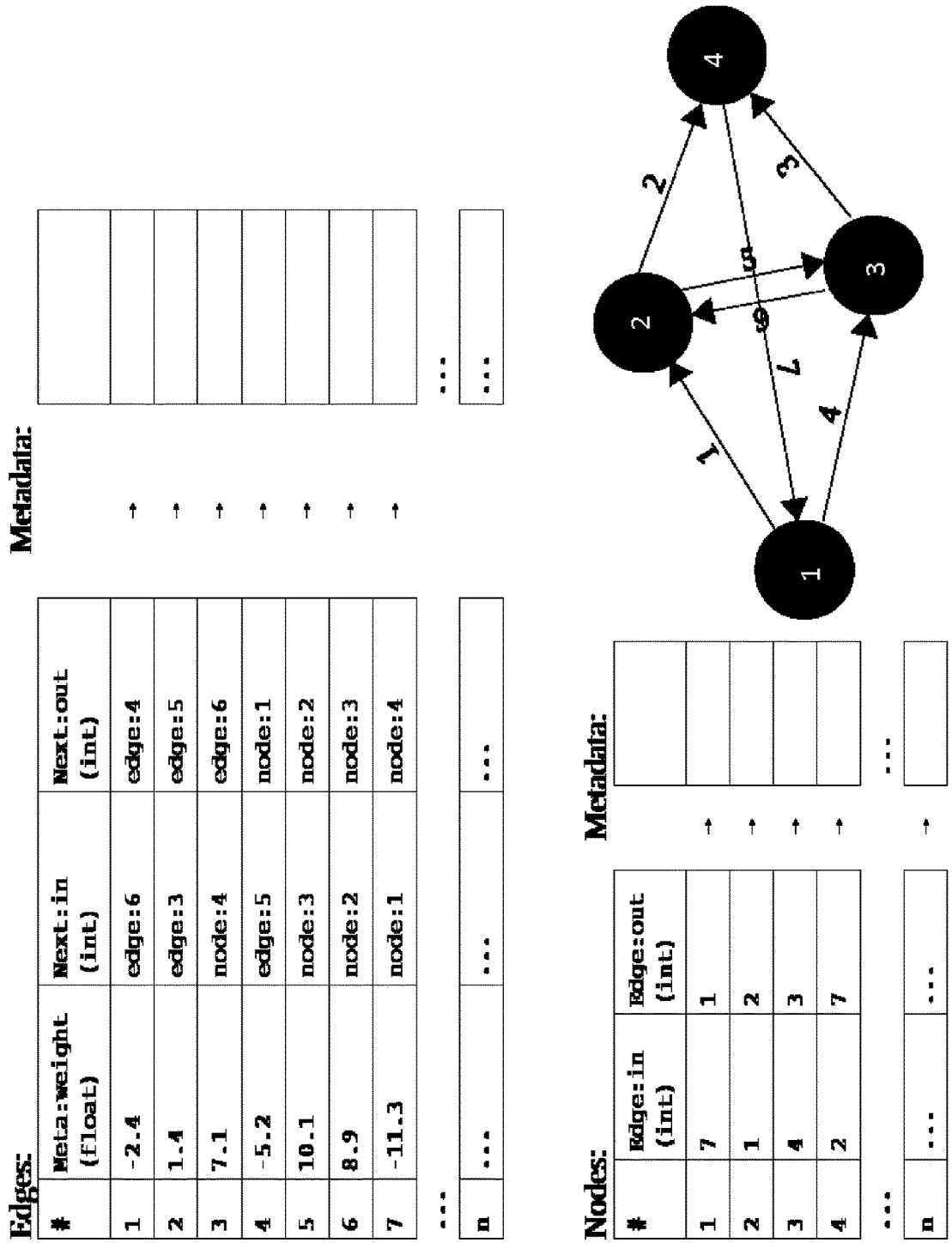
FIG. 6 depicts an example graph and its tabular storage, in an embodiment.

FIG. 6 depicts tabular data structures for encoding a directed acyclic graph. In the lower right of FIG. 6. is the graph. The graph has nodes 1-4, which are vertices. The graph also has edges 1-7. In the lower left of FIG. 6 is the node table. Each row of the node table encodes a node. The # column of the node table is an implied column of node indexes. In the upper left of FIG. 6 is the edge table. Each row of the edge table encodes an edge. The # column of the edge table is an implied column of edge indexes. The edge table and node table allow for random access of an edge or node in constant time. Each table is traversable in linear time.

Each node originates and terminates edges. Although not apparent in FIG. 6, the edge table and the node table also encode two indirect circular linked lists for each node. One list contains edges that originate at a node. The other list contains edges that terminate at the node. Each link of these lists comprises a row index, of either the edge table or the node table, that designates an edge or node. Each list is sorted by edge weight, either ascending or descending. Although each list is sorted, the edge table as a whole is not necessarily sorted, and by design the algorithm does not require this list to be globally sorted. In this example the lists are sorted by ascending edge weight. Although each list has a set of edges, each list has exactly one node. The indirect circularity of each list refers to the fact that, although the list is composed almost entirely of edges, the edges of the list do not form a cycle by themselves. It is the one node in each list that completes the cycle. Although each list is circular, the node of a list may be treated as a head of the list.

Each node is the head of two lists, which are linked into by the edge-in and edge-out columns of the node table. The edge-in column has an edge index of an edge, with the least value of weight, that terminates at the node. For example, node 4 terminates edges 2 and 3. Edge 2 has less weight than edge 3. Thus, 2 is the value for the edge-in column of node 4. This means that node 4 is the head of a list of edges that terminate at node 4, and edge 2 is the first edge in the list. Since edge 3 is the next edge in the list, 3 is the value of the next-in column of the edge table for edge 2. Edge 3 is the last edge in the list, and node 4 is the head of the list. Since the list is circular, the last edge indirectly links back to the head through the node table. Thus node 4 is the value of the next-in column of the edge table for edge 3 and edge 2 is the value of the edge-in column of the node table for node 4.

The values of the next-in column of the edge table are a mixture of edge indices into the edge table and node indices into the node table. To distinguish indices of the two tables, a link that is based on a node index may be encoded as the additive inverse of the node index. Thus although FIG. 6 shows node:4 as the value of the next-in column of the edge table for edge 3, the value may be encoded as −4. An embodiment may instead use a different means of distinguishing edge indices from node indices, such as reserving one range of nonnegative indices for edges and another nonnegative range for nodes. An embodiment may instead distinguish indices according to a special bit encoding or by addition of a Boolean column or other flag.

As already explained, the links of a list of edges that terminate at a node are encoded in the edge-in column of the node table and the next-in column of the edge table. Likewise, the links of a list of edges that originate at a node are encoded in the edge-out column of the node table and the next-out column of the edge table. Since the lists are sorted by edge weight, an embodiment may resort the lists when edge weights change or an edge is inserted or removed. Resorting a list involves reassigning some values of the next-in, next-out, edge-in, or edge-out columns. However, resorting a list does not reorder the rows of the edge and node tables. For example, edge 3 is always the third edge in the edge table, regardless of edge weight adjustments and lists resorting. Another embodiment may avoid resorting and let a list become somewhat unsorted, with minimal effect on the quality of the algorithm results and improving overall performance.

Figure 7:
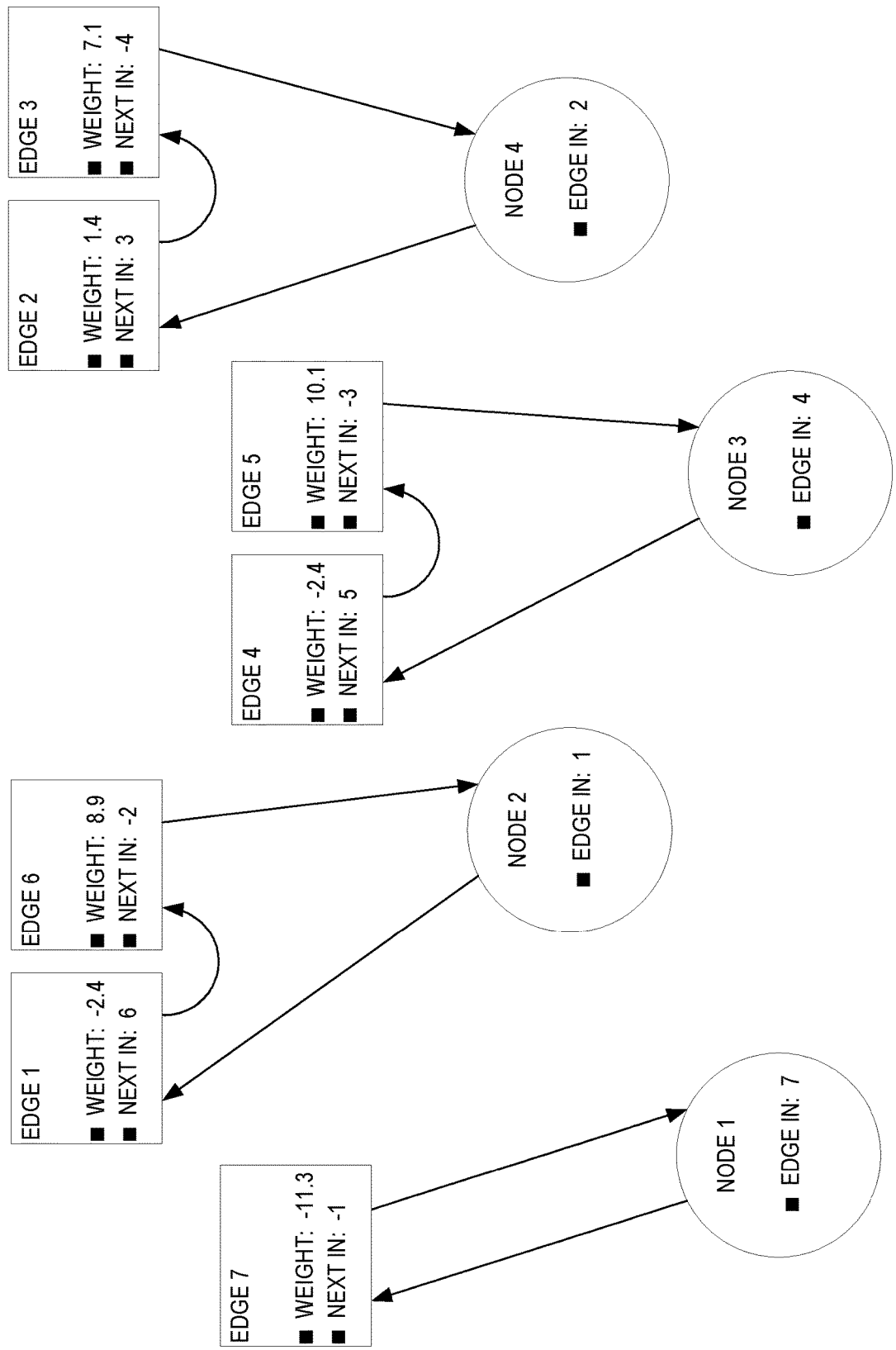
FIG. 7 depicts example circular linked lists, in an embodiment.

FIG. 7 depicts a circular linked list for each node of FIG. 6. Although each node of FIG. 6 is part of one list that uses the edge-out column and another list that uses the edge-in column, only the latter is shown in FIG. 7. Thus in FIG. 7, each list has the edges that terminate at a node. Likewise although each edge of FIG. 6 is part of one list that uses the next-out column and another list that uses the next-in column, only the latter is shown in FIG. 7. As already discussed, node 4 terminates edges 2 and 3, as shown on the right side of FIG. 7.

5.1 Graph Storage Process

Figure 8:
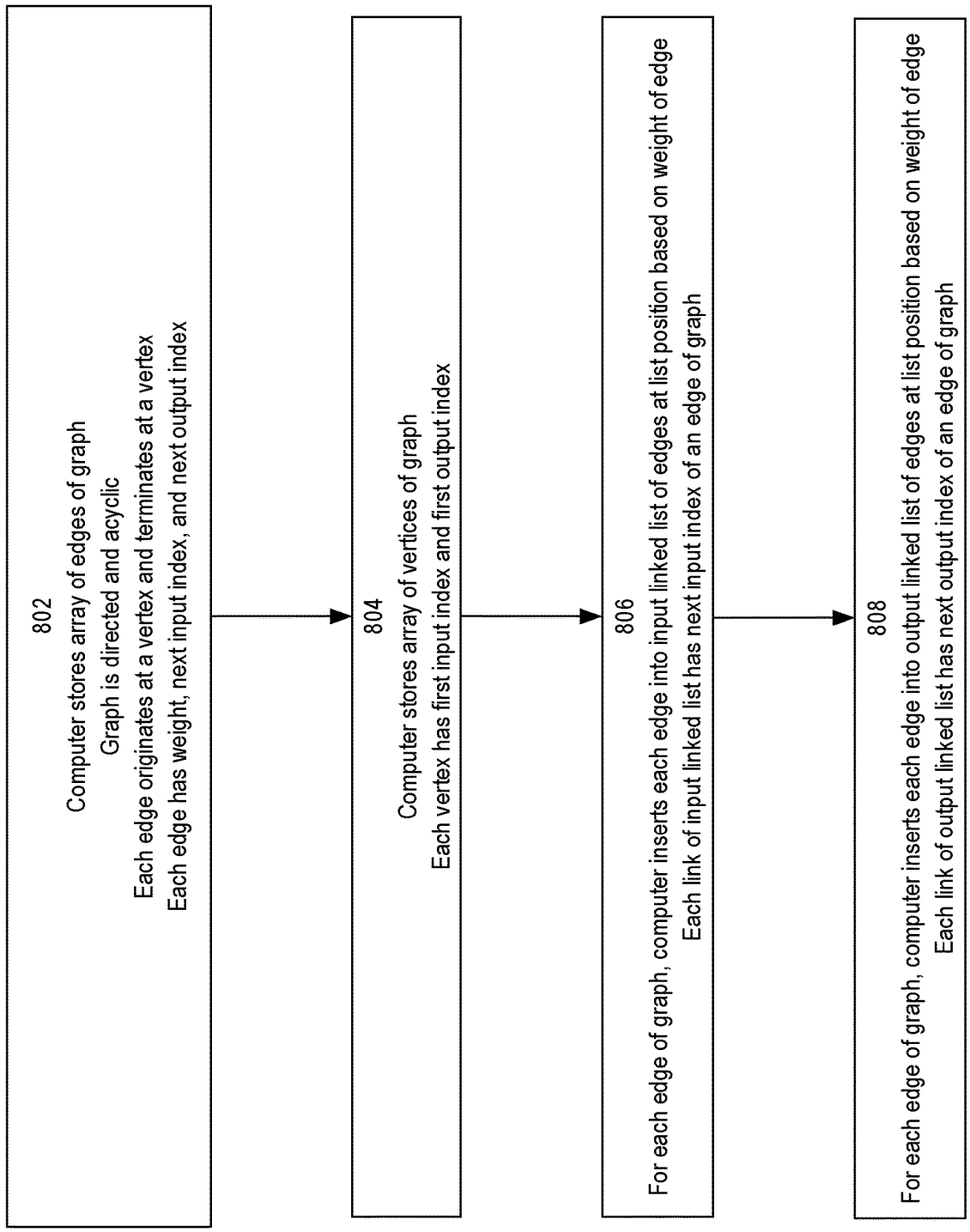
FIG. 8 is a flow diagram that depicts an example graph storage process, in an embodiment.

FIG. 8 is a flow diagram that depicts a graph storage process, in an embodiment. The graph storage process is described in the context of FIGS. 6-7.

In step 802, edges of a directed acyclic graph are stored in an edge array having a row for each edge. Each edge originates at a vertex of the graph and terminates at another vertex. Each edge has a weight, a next input index, and a next output index. These indices are links in the two indirect circular linked lists discussed above for the edge table. The edge array may have a column for each field of an edge, such as next input and output indices.

In step 804, vertices are stored in a node array having a row for each vertex. Each vertex has a first input and first output edge indices. These indices are links in the two circular linked lists discussed above for the node table.

In step 806, an input linked list of each vertex is populated. This is a sorted list of edges that terminate at a given vertex, as explained above. Sorting may occur during list construction. Sorting may comprise insertion sort, bubble sort, or shell sort. In this example, sorting is based on edge weight, but other embodiments may have other sort criteria. Because the given vertex is the head of the list, the value of the first input index of the vertex is the edge array index of the first edge of the list. Because the list is circular, the value of the next input index of the last edge of the list is the node array index of the vertex.

Step 808 is similar to step 806, except that it builds a sorted list of edges that originate, rather than terminate, at a given vertex. The links of this list are the first output index of the given vertex and the next output indices of participating edges.

5.2 Sparsification Based on Node Table, Edge Table, and Metadata

An edge or a node may have additional fields. To keep the edge and node tables lean, these additional fields may be stored outside of the edge and node tables, such as in the ancillary metadata tables shown in FIG. 6. Metadata of each edge may encode membership of the edge in additional lists. For example, edge metadata may have a removed index that serves as a link in a list of edges that have been removed by sparsification and terminate at a given vertex. Likewise, edge metadata may have a kept index that serves as a link in a list of edges that have not been removed by sparsification and terminate at a given vertex. When an edge is removed during sparsification, the edge may be removed from the kept list and inserted into the removed list. Metadata of each edge may include a removed flag that indicates whether the edge was removed by sparsification.

Before sparsification of a neural network, the list of kept edges of a vertex may be huge because the vertex terminates an edge from each vertex of a previous layer in the neural network. However as sparsification occurs, most edges are removed, and the list of kept edges becomes small. Hence, a list of kept edges may be traversed in nearly constant time.

Metadata of each vertex may capture details of how the vertex was originally configured before sparsification or is presently configured. For example, metadata of a vertex may record the original or current aggregate weight of all edges that terminate at the vertex. Metadata of a vertex may record an original or current count of input or output edges of the vertex, which is the original or current size of the kept edge list of the vertex.

5.3 Sparsification Based on Criteria

During sparsification, edge removal may be based on criteria such as a threshold, a range, or a target value or amount. Criteria may regard an amount of input or output edges of a vertex, an aggregate input or output weight of a vertex, or a weight of an edge. A value of a criterion may be derived from the original graph, the current graph, or both. A value of a criterion may be a statistical property of a sampled subset of edges or vertices of the original or current graph. Sparsification may use some criteria for removing edges of positive weight and different criteria for removing edges of negative weight. Sparsification may determine a maximum, minimum, or average weight of a sample of edges of positive or negative weight.

Removal of too many edges of a vertex may impair the utility of the vertex. For example, a vertex with either no input edges or no output edges contributes nothing to the behavior of a neural network. Likewise, an edge with a weight of nearly zero is mathematically akin to a removed edge. Edges are disturbed by removal during sparsification and by weight adjustment during optimization solving, the combination of which may cause an edge count or aggregate edge weight of a vertex to violate some threshold or range of the criteria. Consequentially, some removed edges may need restoration, such that sparsification may add some removed edges back into the graph. Selection of an edge to restore may be based on the weight of the edge, the aggregate edge weight of the vertex, or a statistical property of a sample of edges or vertices of the original or current graph.

6.0 PHASES OF A SPARSIFICATION ITERATION

Figure 9:
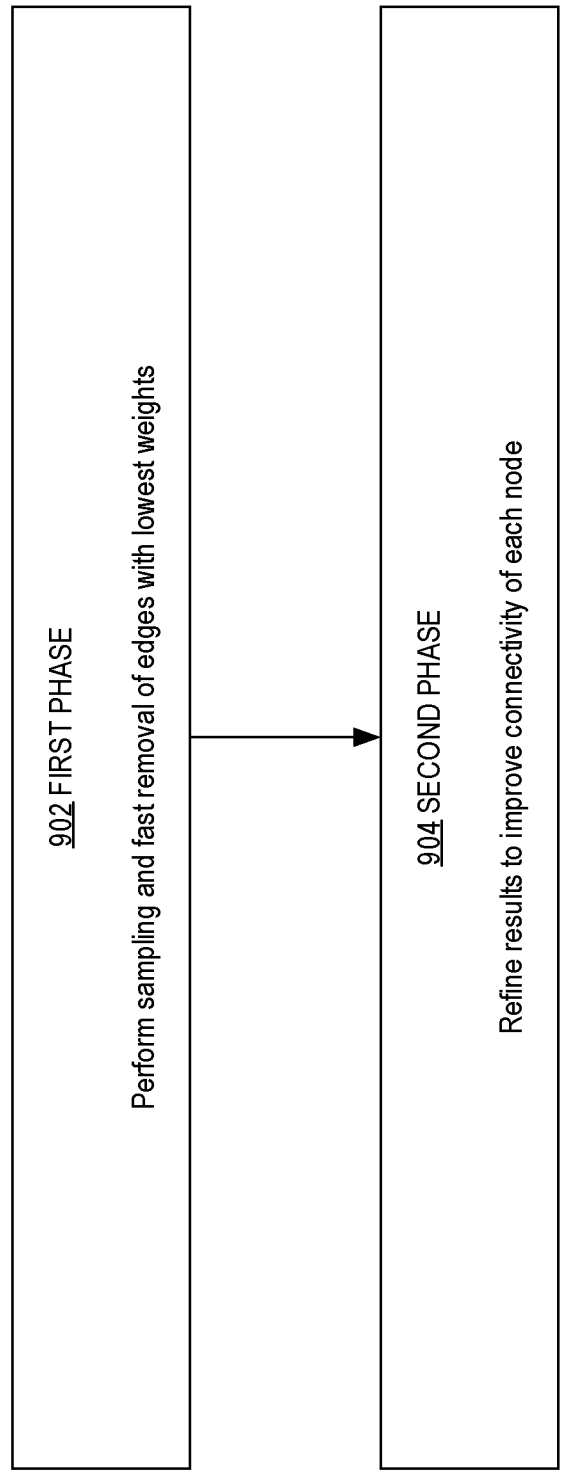
FIG. 9 is a flow diagram that depicts an example sparsification process, in an embodiment.

FIG. 9 depicts a flowchart of phases 900 that occur during sparsification. Sparsification is repeated during each training iteration. Each performance of sparsification has phases 902 and 904 of phases 900 that sequentially occur. One or both of phases 900 rely on the following node metadata and edge metadata.

Each edge has metadata that includes a Boolean flag indicating removal, an index of a next kept input edge, and an index of a next removed input edge. These indices reference another edge in the edge table. These indices are similar to the next-in column described above that defines a circular list. However, next kept input and next removed input are indices that each define a list containing a subset of that circular list. Each subset respectively contains only kept edges or only removed edges that terminate at a given node.

Each node has metadata that includes original input weight, current input weight, input edge count, output edge count, kept in edge index, and removed in edge index. The output edge count indicates how many edges have not been removed and that originate from the node. The input edge count indicates how many edges have not been removed and that terminate at the node. The current input weight is the sum of weights of all edges that have not been removed and that terminate at the node. The original input weight is the sum of weights of all edges that terminate at the node, regardless of whether the edges are removed or not. At the start of each training iteration, the current input weight and input edge count of each node are reset to zero. The original input weight is reset to zero only at the start of the first iteration. The kept in edge index refers to the first edge that is not removed from the input edge list of the node. The removed in edge index refers to the first edge that is removed from the input edge list of the node.

6.1 First Phase of a Sparsification Iteration

First phase 902 performs fast removal of edges with lowest weights. Because such edges do not significantly contribute to the computational potential of a graph, they are wasteful of time during training and in production and wasteful of space in production. Fast removal of edges relies on two mechanisms. First, the edges are not actually removed from the edge table, but are instead flagged as removed, perhaps in edge metadata. Second, perfect results are not expected during first phase 902. As such, first phase 902 may use streamlined logic that inaccurately identifies edges to remove. First phase 902 may remove too few or too many edges, which can be corrected by second phase 904.

6.1.1 First Step of First Phase

Figure 10:
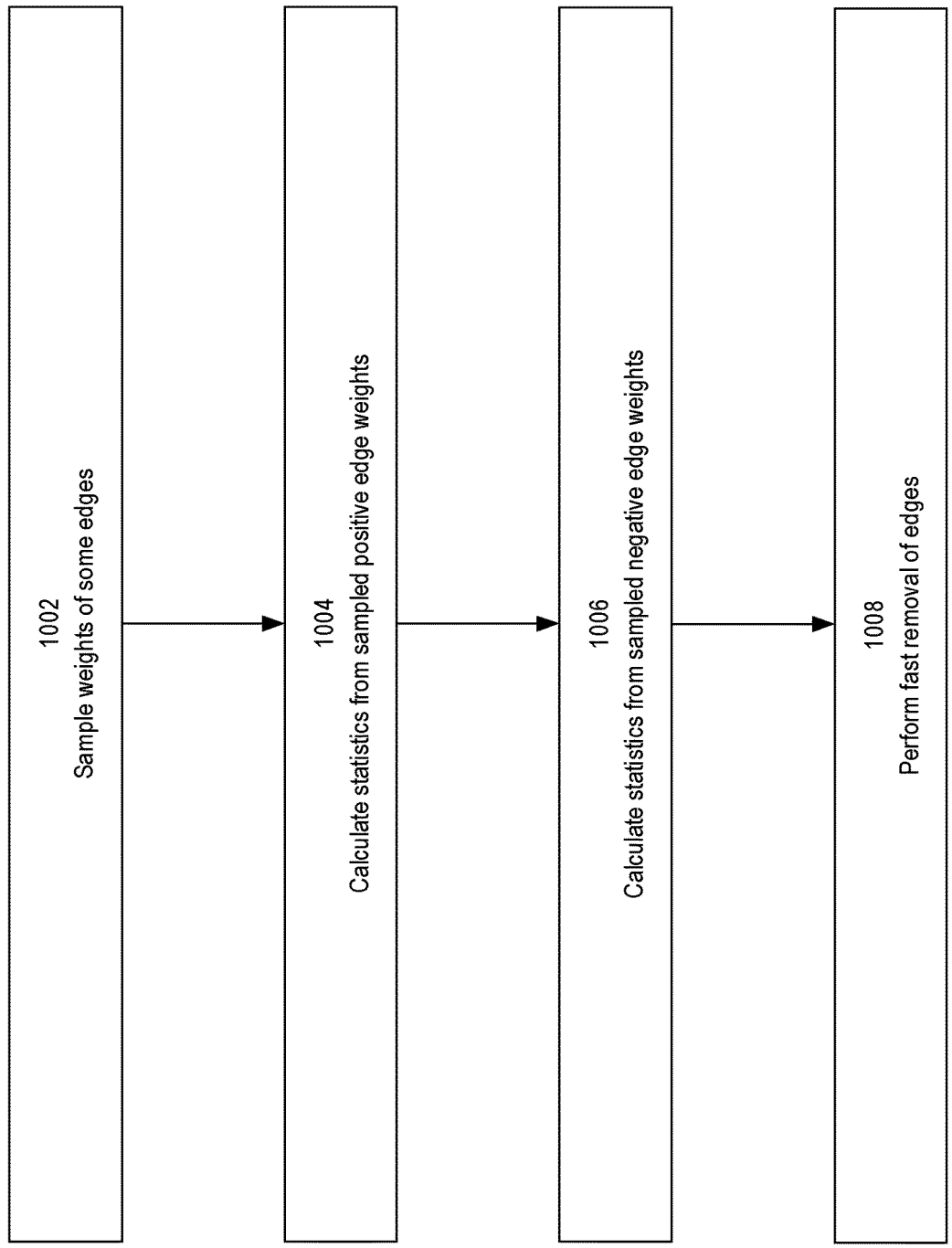
FIG. 10 is a flow diagram that depicts an example fast edge removal process, in an embodiment.

FIG. 10 depicts a flowchart of first phase 902. Step 1002 samples the weights of an amount of edges of the graph. The amount of edges sampled depends on the implementation. For example, the sample size may depend on the total amount of edges available in the current training iteration. There may be a tradeoff involved with selecting a sample size. For example, a sample size that is too big may cause sampling to consume excessive time. Whereas, a sample size that is too small may increase the amount of training iterations needed for convergence, which also consumes excessive time.

The sampled edge weights are divided into two groups. One group has positive edge weights. The other group has negative edge weights.

6.1.2 Second Step of First Phase

Step 1004 calculates statistics from the sampled positive edge weights. This involves calculating an approximate weight cutoff, an upper weight value, and a lower weight value. The lower weight value is the minimum weight of the sampled positive edge weights. The upper weight value is the maximum weight of the sampled positive weights.

The approximate weight cutoff depends on how few edges are desired after all training iterations have finished. After training, the neural network may be deployed in production. As such, how few edges are desired at the end of training depends on how many edges can be accommodated in production. This depends on a production implementation and may include considerations such as the price of memory, the speed of a microprocessor, the desired response time of the neural network, and the desired accuracy of the neural network. For embedding in a mobile device, the impact of power consumption on battery charge may also be a concern. With the exception of desired accuracy, fewer edges is better.

The approximate weight cutoff is an estimated weight that an edge would need to avoid removal during all training iterations. The approximate weight cutoff is a function of the sampled positive edge weights and the ratio of desired amount of edges after training to the original amount of edges before training. The ratio indicates what fraction of edges should survive training. For example, the approximate weight cutoff may be that ratio times the average of the sampled positive weights.

6.1.3 Third Step of First Phase

Step 1006 calculates statistics from the sampled negative edge weights. This involves calculating the same values as step 1004, except that the sampled negative edge weights are used instead of the sampled positive edge weights.

6.1.4 Fourth Step of First Phase

Figure 11:
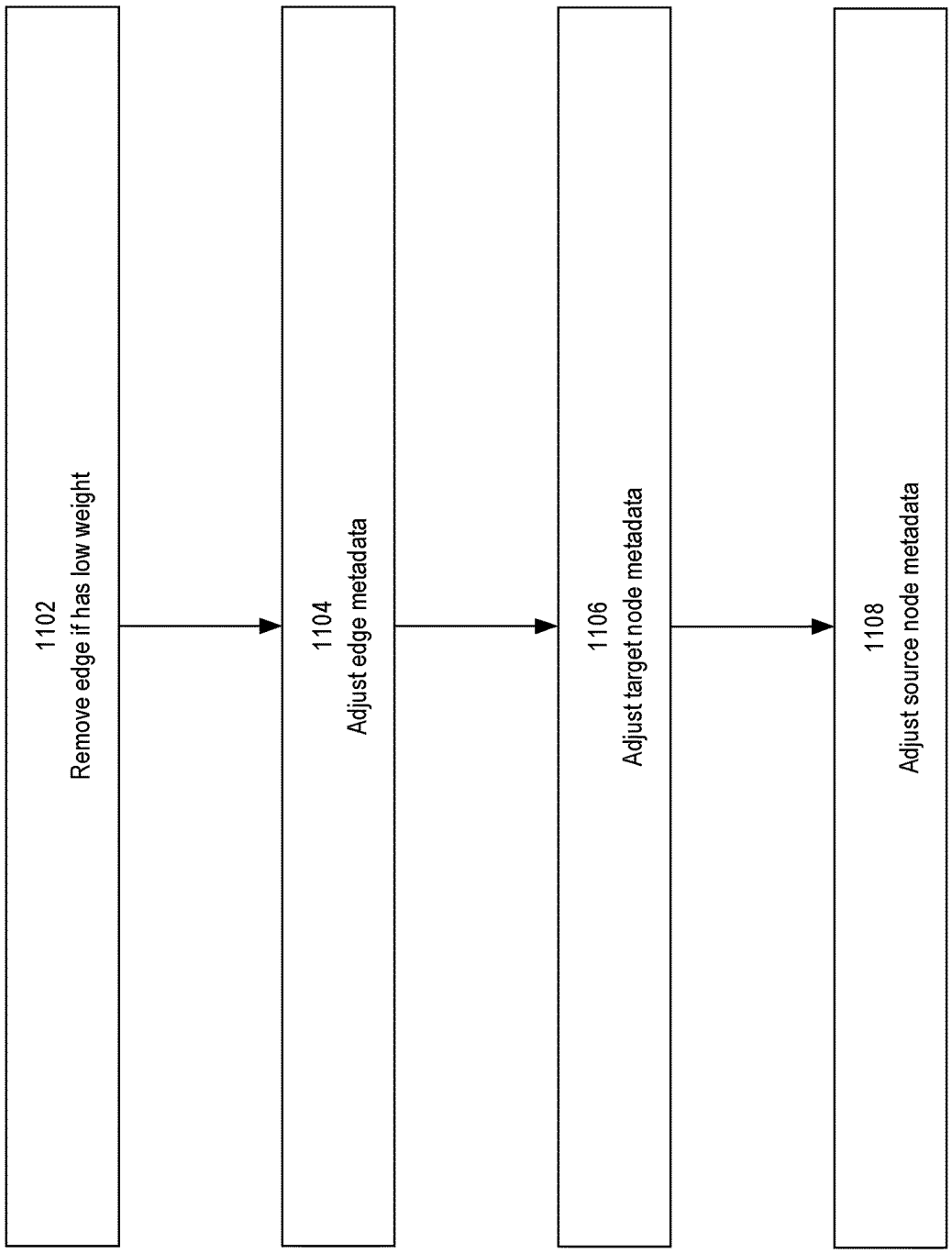
FIG. 11 is a flow diagram that depicts an example edge removal process, in an embodiment.

Step 1008 performs fast removal of edges. Step 1008 iterates over all edges currently in the graph. Upon each edge of the graph, the steps shown in the flowchart of FIG. 11 are performed to accomplish the sub-steps of step 1008.

6.1.4.A Step 1102

If the weight of the current edge is positive and less than the positive approximate weight cutoff, then that edge becomes removed. Removal is accomplished by setting the removed flag of the edge. Likewise, if the weight of the edge is negative and greater (closer to zero) than the negative approximate weight cutoff, then the edge becomes removed.

6.1.4.B Step 1104

Step 1104 is performed only if the current edge is removed during step 1102.

The next-in column of the row of the current edge in the edge table is dereferenced to identify the next input edge in the circular list. The removed flag of the next input edge indicates whether or not that edge was removed, either during this training iteration or during some prior iteration.

If the next input edge was removed, then the following adjustments occur. The next kept input index of the next input edge is set to the next kept input index of the current edge. The next removed column of the current edge is set to the next input index of the current edge.

Otherwise, the next input edge was not removed, and the following adjustments occur. The next kept column of the current edge is set to the next input index of the current edge.

The next removed input index of the next input edge is set to the next removed input index of the current edge.

6.1.4. C Step 1106

The current edge terminates at a node. The metadata of that node is updated as follows. If this is the first iteration, the original input weight of the node is incremented by the weight of the current edge. If the current edge is removed during step 1102, then no additional activity occurs during step 1106. Otherwise, the input edge count of the node is incremented by one, and the current input weight is incremented by the weight of the current edge.

6.1.4.D Step 1108

The current edge originates from a node. The metadata of that node is updated as follows. If the current edge is removed during step 1102, then no additional activity occurs during step 1108. Otherwise, the output edge count of the node is incremented by one.

6.2 Second Phase of a Sparsification Iteration

Second phase 904 refines the results of first phase 902 to improve the connectivity of each node. Second phase 904 emphases precision. Second phase 904 iterates over all nodes. At each node, the five sequential steps are performed.

Figure 12:
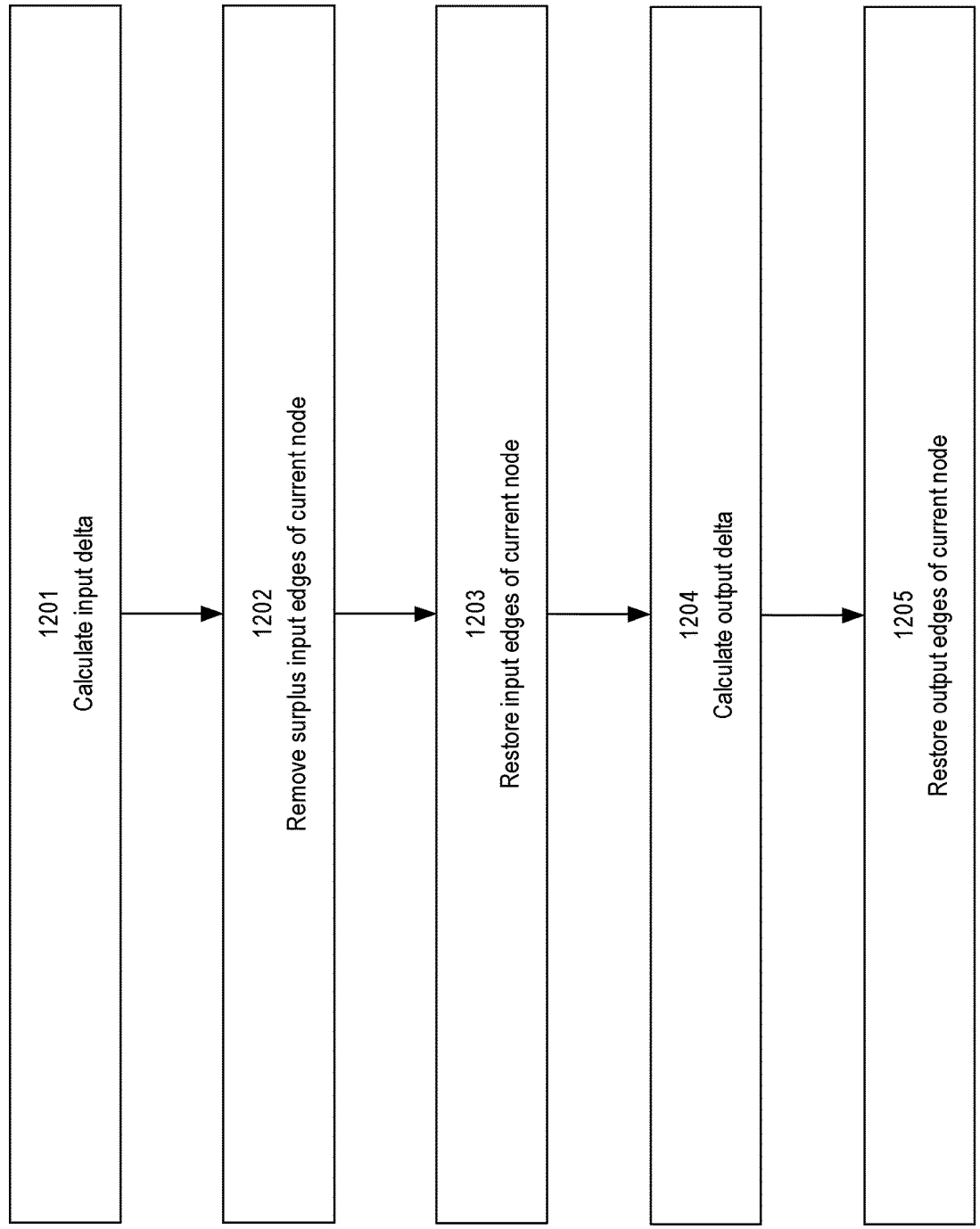
FIG. 12 is a flow diagram that depicts an example edge restoration process, in an embodiment.

First phase 902 may have removed too many or too few input edges or output edges of the current node. An implementation may define an ideal input count and a minimum output count as constants to constrain fan-in and fan-out of edges at a node. Likewise, an implementation may define an ideal input weight to compare against the current input weight of a node. Upon each node of the graph, the steps shown in the flowchart of FIG. 12 are performed to accomplish second phase 904.

6.2.1 First Step of Second Phase

During step 1201, the amount of input edges of the current node is compared to the desired input count. An input delta is calculated by subtracting the ideal input count from the current amount of input edges left after step 1008. The absolute value of the input delta is calculated.

6.2.2 Second Step of Second Phase

Figure 13:
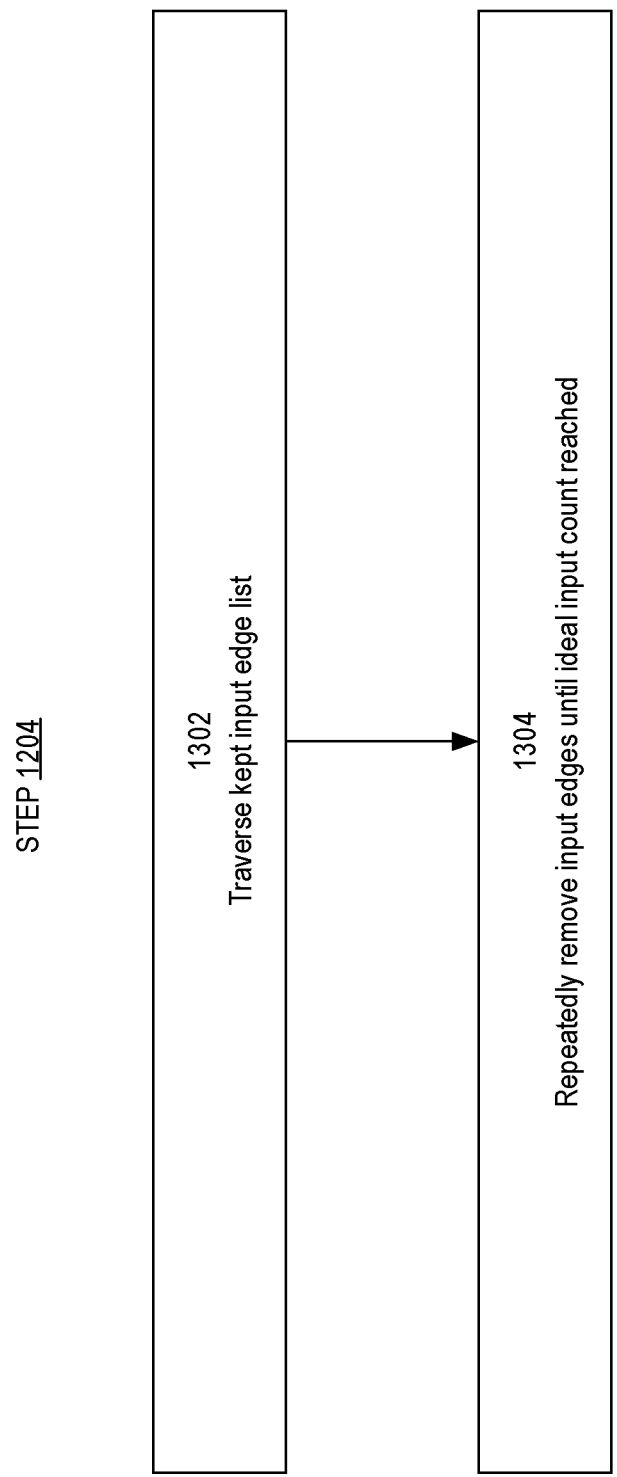
FIG. 13 is a flow diagram that depicts an example edge removal process, in an embodiment.

Step 1202 is performed only if the input delta is negative, which occurs if first phase 902 removed too few input edges from the node. Upon the current node of the graph, the sub-steps shown in the flowchart of FIG. 13 are performed to remove surplus edges of the current node.

6.2.2.A Removal Step 1302

The kept in edge index of the node refers to the list of edges that are not removed and that terminate at the node. This list is traversed during step 1302 to gather two subsets of edges, a positive subset and a negative subset of edges that are candidates for removal. Traversal continues until the size of each subset has grown to equal the absolute value of the input delta or until the list is exhausted. The positive subset accumulates edges with positive weights that vary by at most an implementation-defined amount from the positive approximate weight cutoff that was calculated during first phase 902. Likewise, the negative subset accumulates edges with negative weights that vary by at most an implementation-defined amount from the negative approximate weight cutoff.

Each input edge of the current node originates from a source node. An edge will not be added to either subset if removal of the edge would cause the amount of output edges that originate from the source node to fall below the minimum output count.

6.2.2.B Removal Step 1304

During step 1304, input edges are removed one at a time until the current node has reached the ideal input count. Before removing each edge, the current input weight of the node is compared to the ideal input weight. If the ideal input weight is exceeded, then an edge is taken from the positive subset and removed by setting its removed flag. Likewise, if the ideal input weight is not reached, then an edge is taken from the negative subset and removed by setting its removed flag. Otherwise, the current input weight momentarily equals the ideal input weight, and the negative subset and positive subset are checked for emptiness. If neither subset is empty while the ideal input weight is achieved, then an edge whose weight is closest to zero is taken from each subset, and the removed flag of those taken edges are set. When removing an edge during step 1304, both the next kept index and next removed index are updated to reflect a change in the corresponding edge lists. This is done similarly to removing an edge as described for step 1104. While removing an edge, step 1304 repeats upon the current node until the ideal input count is reached or a needed subset is exhausted.

6.2.3 Third Step of Second Phase

Figure 14:
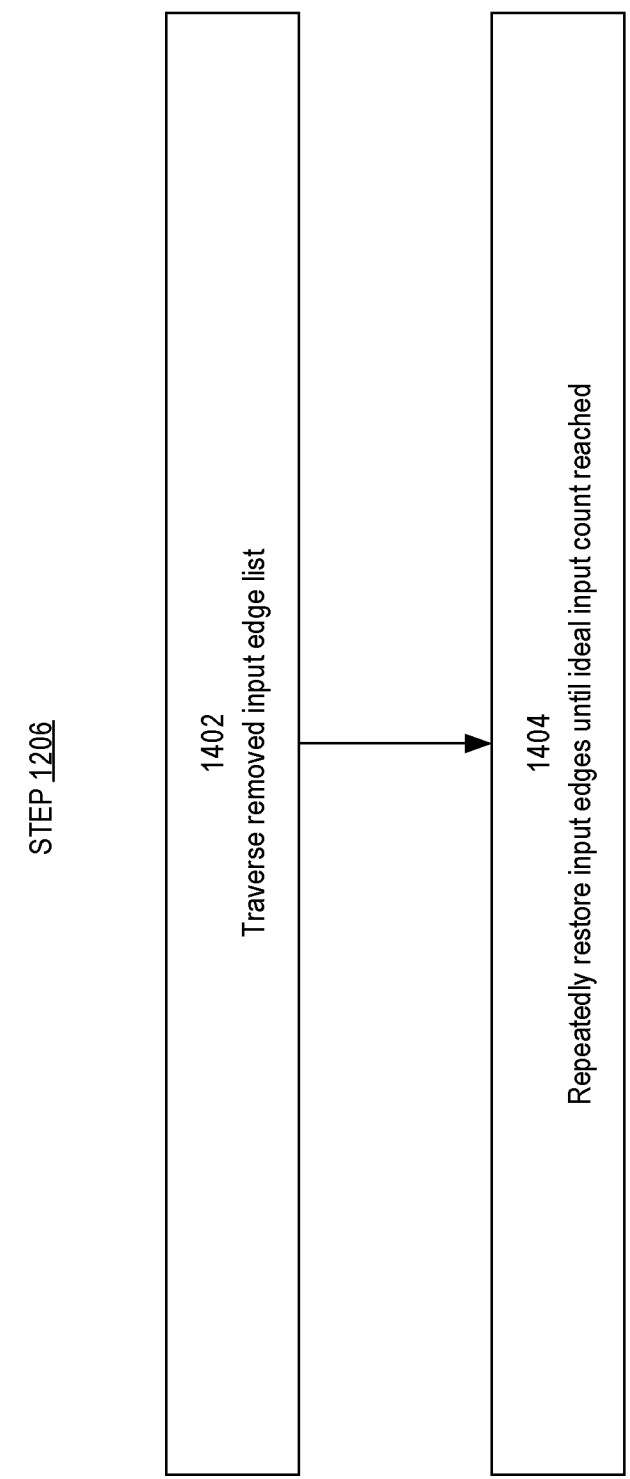
FIG. 14 is a flow diagram that depicts an example edge restoration process, in an embodiment.

Step 1203 is performed only if the input delta is positive, which occurs if first phase 902 removed too many input edges from the node. The third step is similar to the second step and has similar sub-steps. Unlike the second step, this third step restores edges that were over-aggressively removed. Upon the current node of the graph, the sub-steps shown in the flowchart of FIG. 14 are performed to remove surplus edges of the current node.

6.2.3.A Restoration Step 1402

The removed in edge index of the node refers to the list of edges that are removed and that terminate at the node. This list is traversed to gather two subsets of edges, a positive subset and a negative subset of edges that are candidates for restoration. Traversal continues until the size of each subset has grown to equal the absolute value of the input delta or until the list is exhausted. The positive subset accumulates edges with positive weights that vary by at most an implementation-defined amount from the positive upper weight value that was calculated during first phase 902. Likewise, the negative subset accumulates edges with negative weights that vary by at most an implementation-defined amount from the negative upper weight value.

6.2.3.B Restoration Step 1404

Removed input edges are restored one at a time until the current node has reached the ideal input count. Before restoring each edge, the current input weight of the node is compared to the ideal input weight. If the ideal input weight is exceeded, then an edge is taken from the negative subset and restored by clearing its removed flag. Likewise, if the ideal input weight is not reached, then an edge is taken from the positive subset and restored by clearing its removed flag. Otherwise, the current input weight momentarily equals the ideal input weight, and the negative subset and positive subset are checked for emptiness. If neither subset is empty while the ideal input weight is achieved, then an edge whose weight is closest to zero is taken from each subset, and the removed flag of those taken edges are cleared. After restoring an edge, both the next kept index and next removed index are updated to reflect the change in the corresponding edge lists. Step 1404 repeats upon the current node until the ideal input count is reached or a needed subset is exhausted.

6.2.4 Fourth Step of Second Phase

The amount of output edges of the current node is compared to the minimum output count. An output delta is calculated during step 1204 by subtracting the minimum output count from the current amount of output edges. The absolute value of the output delta is calculated.

6.2.5 Fifth Step of Second Phase

Figure 15:
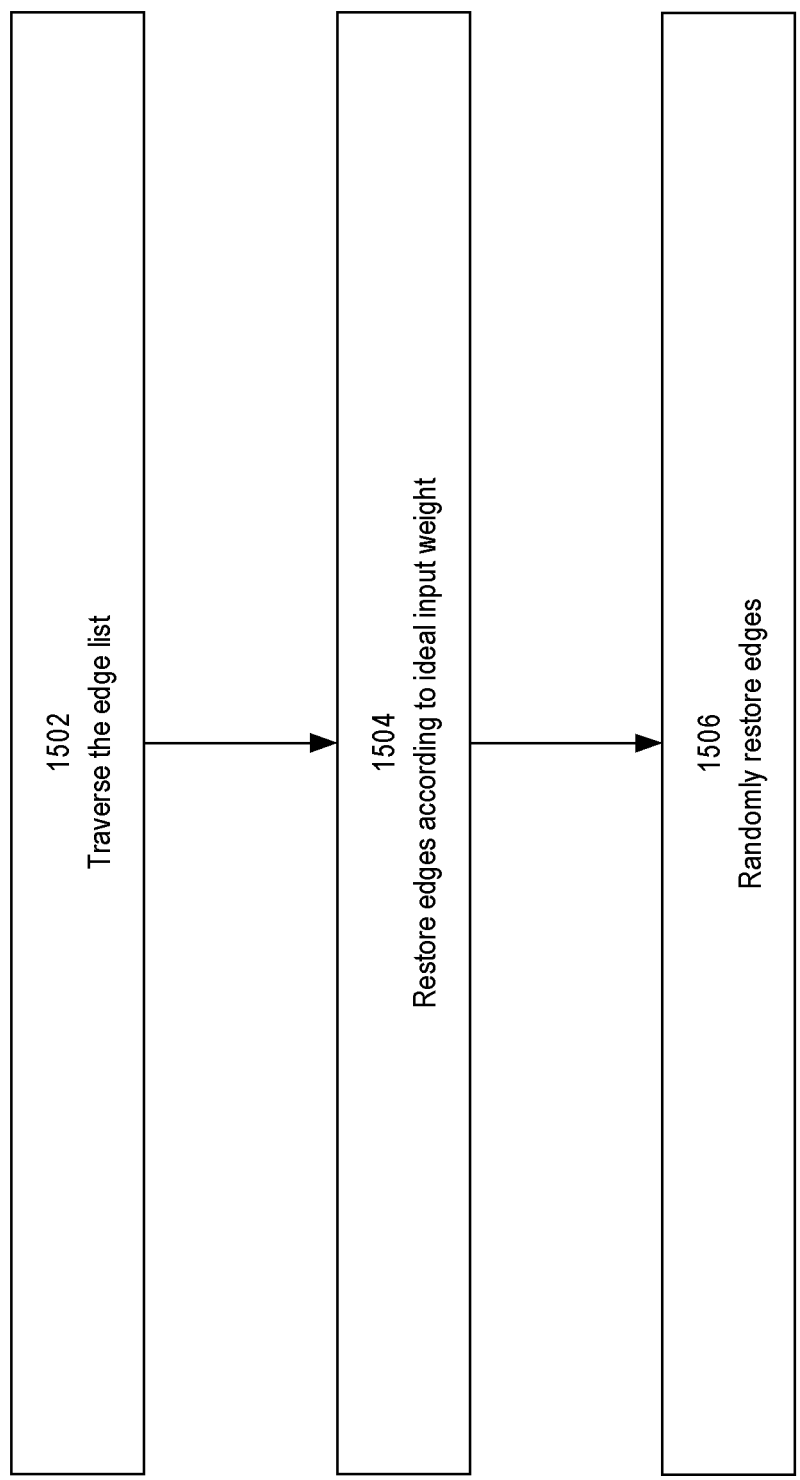
FIG. 15 is a flow diagram that depicts an example edge restoration process, in an embodiment.

Step 1205 is performed only if the output delta is negative, which may occur if either first phase 902 or second phase 904 removed too many output edges from the node. Upon the current node of the graph, the sub-steps shown in the flowchart of FIG. 15 are performed to remove or restore edges of the current node.

6.2.5.A Output Step 1502

The out-edge column of the row of the current node in the node table refers to the list of all edges that originate from the node, regardless of whether or not the edges are removed. This list is traversed during sub-step 1502 to gather a restoration subset of edges that are candidates for restoration. Traversal continues until the size of the restoration subset has grown to equal the absolute value of the output delta or until the list is exhausted. An edge will not be added to the restoration subset if the removed flag of the edge indicates that the edge is not removed.

6.2.5.B Output Step 1504

During step 1504, each output edge of the restoration subset is processed as follows. The edge terminates at a target node. If adding the weight of an edge to the current input weight of its target node brings the current input weight closer to the ideal input weight, then the edge is restored by clearing its removed flag.

6.2.5.C Output Step 1506

The output delta and its absolute value are recalculated during step 1506. If the output delta remains negative, then its absolute value is an amount of edges to restore from the restoration subset by clearing their removed flags. These edges are selected at random from the restoration subset. If the absolute value exceeds the size of the restoration subset, then the entire restoration subset is restored.

6.2.6 Sparsification Results Transfer

The result of graph sparsification may be generated in a format that can be consumed by the following algorithm. During this generation process, two levels of node lists are walked. At the higher level, the graph node list is iterated. For each node that is visited during iteration, the list of kept nodes for the visited node is iterated. This produces a sparsified graph matrix that may be stored in a popular sparse format such as Compressed row Storage (CRS or CSR), Compressed sparse column (CSC or CCS), Yale, Coordinate list (COO), List of lists (LIL), Dictionary of keys (DOK), or any other graph serialization format. To improve overall performance, the output data set can be kept in memory without changes and given to a subsequent processing algorithm as a set of memory pointers to avoid unneeded memory copying and external storage access, thereby effectively lowering memory requirements and greatly improving runtime of each iteration.

7.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
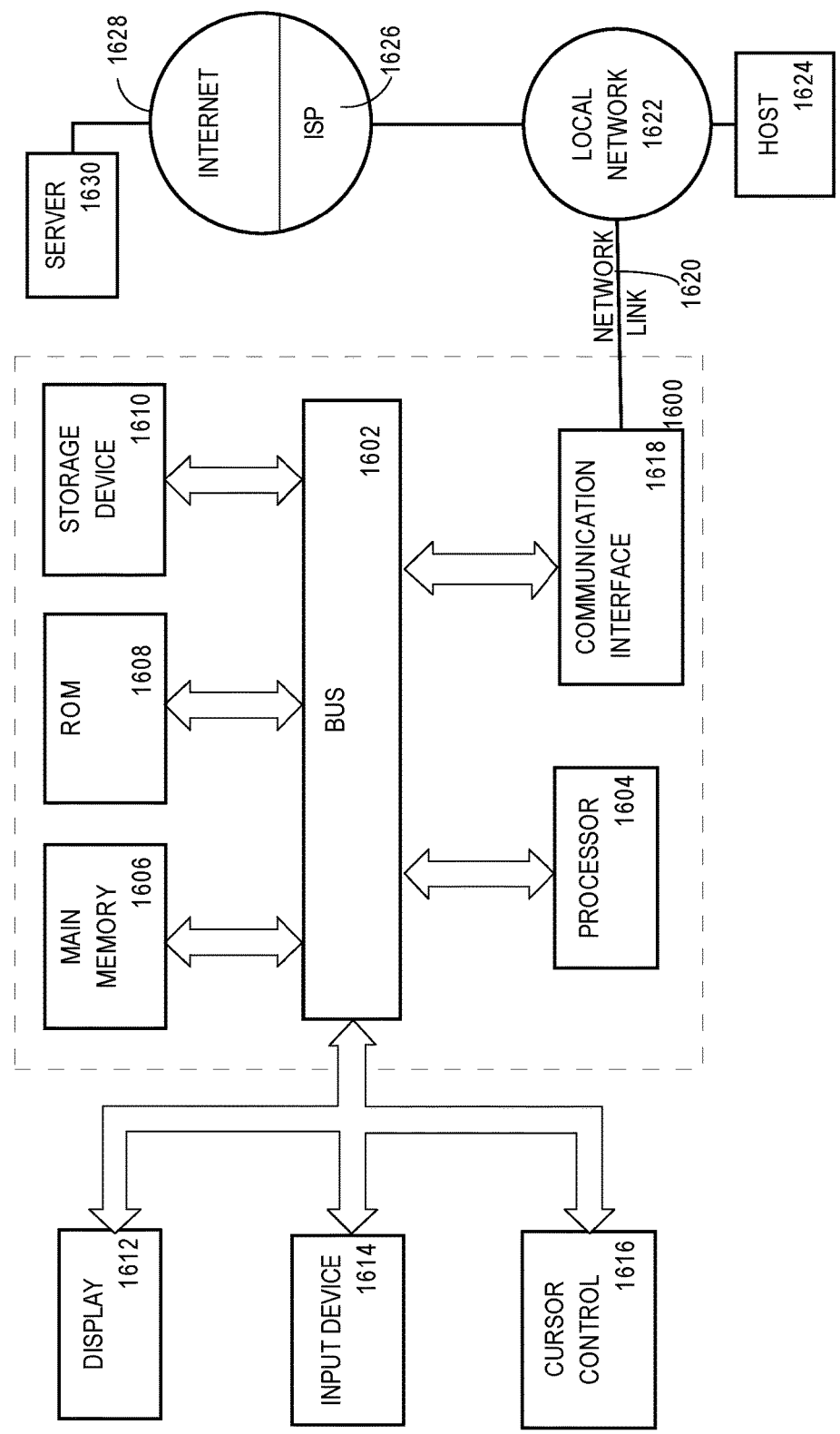
FIG. 16 is a block diagram that illustrates a computer system upon which an embodiment of the invention may be implemented.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 ADDITIONAL EXAMPLE EMBODIMENTS

The following are enumerated example embodiments for the techniques described herein.

1. A method comprising a computer storing an array of edges of a graph, wherein the graph is directed and acyclic, wherein each edge originates at a vertex and terminates at a vertex, wherein each edge is associated with a weight, wherein each edge comprises a next input index and a next output index; the computer storing an array of vertices of the graph, wherein each vertex comprises a first input index and a first output index; for each edge of the graph, the computer inserting the each edge into an input linked list of edges at a list position based on the weight of the each edge, wherein each link of the input linked list comprises the next input index of an edge of the graph; for each edge of the graph, the computer inserting the each edge into an output linked list of edges at a list position based on the weight of the each edge, wherein each link of the output linked list comprises the next output index of an edge of the graph.

2. The method of example embodiment 1 wherein each edge of the graph is associated with a plurality of edge metadata, wherein the edge metadata comprises a kept index and a removed index, wherein each link of a kept linked list comprises the kept index of an edge, wherein each link of a removed linked list comprises the removed index of an edge, wherein the method further comprises: for each edge of the graph, if the weight of the each edge is between a low threshold and a high threshold, the computer performing: removing the each edge from the kept linked list, adding the each edge to the removed linked list.

3. The method of example embodiment 2 wherein each vertex of the graph is associated with a plurality of node metadata, wherein the node metadata comprises an original weight, a current weight, a current input count, and a current output count, wherein the original weight comprises a total weight of all edges that terminate at the each vertex, wherein the current weight comprises a total weight of all edges that terminate at the each vertex and are contained in the kept linked list, wherein the current input count comprises a count of all edges that terminate at the each vertex and are contained in the kept linked list, wherein the current input count comprises a count of all edges that originate at the each vertex and are contained in the kept linked list.

4. The method of example embodiment 3 further comprising: the computer selecting a positive subset of edges of the graph, wherein the value of the weight of each edge of the positive subset is positive; the computer selecting a negative subset of edges of the graph, wherein the value of the weight of each edge of the negative subset is negative; the computer setting a positive weight threshold based on an average of weights of the positive subset; the computer setting a positive upper weight based on a largest weight of the positive subset; the computer setting a positive lower weight based on a smallest weight of the positive subset; the computer setting a negative weight threshold based on an average of weights of the negative subset; the computer setting a negative upper weight based on a largest weight of the negative subset; the computer setting a negative lower weight based on a smallest weight of the negative subset; for each vertex of the graph, the computer performing: determining a signed input delta based on a difference of an expected input count less the current input count of the each vertex, determining an absolute input delta based on an absolute value of the signed input delta.

5. The method of example embodiment 4 further comprising for each vertex of the graph, performing: if the signed input delta is negative, the computer selecting a removable subset of edges from the kept linked list, wherein a size of the removable subset is based on the absolute input delta; if the signed input delta is negative, the computer repeatedly performing: if current total input weight is lower than a target total input weight, removing a negative edge from the kept linked list and adding the negative edge to the removed linked list, wherein the negative edge has a negative weight, if current total input weight is higher than the target total input weight, removing a positive edge from the kept linked list and adding the positive edge to the removed linked list, wherein the positive edge has a positive weight.

6. The method of example embodiment 5 further comprising for each vertex of the graph, the computer performing: if the signed input delta is positive, selecting a restorable subset of edges from the removed linked list, wherein a size of the restorable subset is based on the absolute input delta; if the signed input delta is positive, repeatedly performing: if current total input weight is lower than the target total input weight, removing a positive edge from the removed linked list and adding the positive edge to the kept linked list, wherein the positive edge has a positive weight, if current total input weight is higher than the target total input weight, removing a negative edge from the removed linked list and adding the negative edge to the kept linked list, wherein the negative edge has a negative weight.

What is claimed is:

1. A method comprising:
storing an artificial neural network that comprises a plurality of edges and a plurality of vertices, wherein:
  each edge of the plurality of edges is associated with a respective weight, and
  each edge of the plurality of edges originates at a respective source vertex of the plurality of vertices and terminates at a respective target vertex of the plurality of vertices;
training the artificial neural network; and
repeatedly during said training:
  a) calculating a statistic of weights of a sampled subset of edges in the artificial neural network and, based on the statistic of the weights of the sampled subset of edges, a threshold that maintains a utility of each vertex in the plurality of vertices; and
  b) removing, when a sum of weights of edges that originate or terminate at the source vertex or the target vertex of a particular edge of the plurality of edges exceeds said threshold, the particular edge from the artificial neural network;
wherein the method is performed by one or more computers.

2. The method of claim 1 wherein:
a particular vertex of the plurality of vertices is associated with a list of edges that originate or terminate at the particular vertex;
the method further comprises sorting the list of edges by weight.

3. The method of claim 2 further comprising:
adjusting a weight of an edge;
resorting the list of edges without moving edges in memory.

4. The method of claim 2 further comprising adjusting a weight of an edge without resorting the list of edges.

5. The method of claim 1 wherein said removing the particular edge comprises setting a flag that indicates that the particular edge is deleted.

6. The method of claim 1 further comprising selecting, based on a first weight threshold when the weight of the particular edge is positive or based on a second weight threshold when the weight of the particular edge is negative, the particular edge for removal.

7. The method of claim 1 wherein:
a kept set of edges consists of edges of the plurality of edges that are not removed;
the method further comprises selecting said sampled subset of edges from the kept set of edges.

8. The method of claim 7 wherein a size of the sampled subset is proportional to a size of the kept set of edges.

9. The method of claim 7 wherein the weight statistic comprises a minimum weight.

10. The method of claim 1 wherein:
the artificial neural network comprises a plurality of layers that includes a first layer and a second layer;
each layer of the plurality of layers contains a respective subset of vertices of the plurality of vertices;
each vertex in the first layer originates a respective subset of edges of the plurality of edges that terminates at each vertex in the second layer.

11. One or more non-transitory computer-readable media storing instructions that, when executed by one or more processors, cause:
storing an artificial neural network that comprises a plurality of edges and a plurality of vertices, wherein:
  each edge of the plurality of edges is associated with a respective weight, and
  each edge of the plurality of edges originates at a respective source vertex of the plurality of vertices and terminates at a respective target vertex of the plurality of vertices;
training the artificial neural network; and
repeatedly during said training:
  a) calculating a statistic of weights of a sampled subset of edges in the artificial neural network and, based on the statistic of the weights of the sampled subset of edges, a threshold that maintains a utility of each vertex in the plurality of vertices; and
  b) removing, when a sum of weights of edges that originate or terminate at the source vertex or the target vertex of a particular edge of the plurality of edges exceeds said threshold, the particular edge from the artificial neural network.

12. The one or more non-transitory computer-readable media of claim 11 wherein:
a particular vertex of the plurality of vertices is associated with a list of edges that originate or terminate at the particular vertex;
the instructions further cause sorting the list of edges by weight.

13. The one or more non-transitory computer-readable media of claim 12 wherein the instructions further cause:
adjusting a weight of an edge;
resorting the list of edges without moving edges in memory.

14. The one or more non-transitory computer-readable media of claim 12 wherein the instructions further cause adjusting a weight of an edge without resorting the list of edges.

15. The one or more non-transitory computer-readable media of claim 11 wherein said removing the particular edge comprises setting a flag that indicates that the particular edge is deleted.

16. The one or more non-transitory computer-readable media of claim 11 wherein the instructions further cause selecting, based on a first weight threshold when the weight of the particular edge is positive or based on a second weight threshold when the weight of the particular edge is negative, the particular edge for removal.

17. The one or more non-transitory computer-readable media of claim 11 wherein:
a kept set of edges consists of edges of the plurality of edges that are not removed;

the instructions further cause selecting said sampled subset of edges from the kept set of edges.

18. The one or more non-transitory computer-readable media of claim 17 wherein a size of the sampled subset is proportional to a size of the kept set of edges.

19. The one or more non-transitory computer-readable media of claim 17, Wherein the weight statistic comprises a minimum weight.

20. The one or more non-transitory computer-readable media of claim 11 wherein:
- the artificial neural network comprises a plurality of layers that includes a first layer and a second layer;
- each layer of the plurality of layers contains a respective subset of vertices of the plurality of vertices;
- each vertex in the first layer originates a respective subset of edges of the plurality of edges that terminates at each vertex in the second layer.

\* \* \* \* \*

UNITED STATES PATENT AND TRADEMARK OFFICE
CERTIFICATE OF CORRECTION

| | |
|---|---|
| PATENT NO. | : 11,775,833 B2 |
| APPLICATION NO. | : 16/592585 |
| DATED | : October 3, 2023 |
| INVENTOR(S) | : Golovashkin et al. |

It is certified that error appears in the above-identified patent and that said Letters Patent is hereby corrected as shown below:

In the Specification

In Column 5, Line 9, delete ""0"" and insert -- "O" --, therefor.

In the Claims

In Column 21, Line 7, in Claim 19, delete "17, Wherein" and insert -- 17 wherein --, therefor.

Signed and Sealed this
Twentieth Day of August, 2024

Katherine Kelly Vidal
*Director of the United States Patent and Trademark Office*